United States Patent
Cho et al.

(10) Patent No.: US 7,336,590 B2
(45) Date of Patent: Feb. 26, 2008

(54) DIELECTRIC REPRODUCING APPARATUS, DIELECTRIC RECORDING APPARATUS, AND DIELECTRIC RECORDING/REPRODUCING APPARATUS

(75) Inventors: Yasuo Cho, 4-5-304, Komegafukuro 2-chome, Aoba-ku, Sendai-shi, Miyagi (JP); Atsushi Onoe, Saitama (JP)

(73) Assignees: Yasuo Cho, Miyagi (JP); Pioneer Corporation, Tokyo (JP)

( * ) Notice: Subject to any disclaimer, the term of this patent is extended or adjusted under 35 U.S.C. 154(b) by 929 days.

(21) Appl. No.: 10/658,751

(22) Filed: Sep. 10, 2003

(65) Prior Publication Data
US 2004/0076047 A1  Apr. 22, 2004

(30) Foreign Application Priority Data
Sep. 11, 2002 (JP) ............................. 2002-265925
Sep. 3, 2003 (JP) ............................. 2003-311829

(51) Int. Cl.
*G11B 7/00* (2006.01)
(52) U.S. Cl. ..................................... 369/126; 369/101
(58) Field of Classification Search ................ 369/126, 369/101
See application file for complete search history.

(56) References Cited

U.S. PATENT DOCUMENTS

| | | | |
|---|---|---|---|
| 2,872,529 A | 2/1959 | Hollmann et al. | |
| 4,320,491 A | 3/1982 | Rustman | 369/126 |
| 4,455,638 A | 6/1984 | Wilson | 369/126 |
| 4,489,278 A | 12/1984 | Sawazaki | 324/457 |
| 5,132,934 A | 7/1992 | Quate et al. | |
| 5,226,029 A | 7/1993 | Takanashi et al. | |
| 5,343,421 A * | 8/1994 | Brennan | 365/145 |
| 5,418,029 A | 5/1995 | Yamamoto et al. | 428/64.2 |

(Continued)

FOREIGN PATENT DOCUMENTS

EP    0 398 656 A2    11/1990

(Continued)

OTHER PUBLICATIONS

Hiranga et al, "Nano-Sized Inverted Domain Formation in Stoichiometric Lita03 Single Crystal Using Scanning Nonlinear Dielectric Microscopy", Integrated Ferroelectrics, New York, New York vol. 49, May 1, 2002, pp. 203-209, XP009035260.

(Continued)

*Primary Examiner*—Gautam R. Patel
(74) *Attorney, Agent, or Firm*—Nixon & Vanderhye (57) ABSTRACT

A dielectric reproducing apparatus is provided with: a probe for applying an electric field to a dielectric material of a dielectric recording medium; a return electrode for returning the electric field applied from the probe; an inductor placed between the probe and the return electrode; an oscillator which oscillates at a resonance frequency determined from the inductor and a capacitance formed in the dielectric material just under the probe; an alternating current (AC) signal generation device for generating an AC signal which is applied to the probe; a frequency modulation (FM) demodulator for demodulating a FM modulation signal modulated by the capacitance corresponding to the polarization state owned by the dielectric material just under the probe; and a phase-shift keying (PSK) demodulator for reproducing data from the demodulated signal.

11 Claims, 9 Drawing Sheets

U.S. PATENT DOCUMENTS

| | | | |
|---|---|---|---|
| 5,481,527 A | 1/1996 | Kasanuki et al. | 369/126 |
| 5,488,602 A | 1/1996 | Yamano et al. | 369/126 |
| 5,581,537 A | 12/1996 | Yamano et al. | 369/126 |
| 5,635,037 A | 6/1997 | Chu et al. | |
| 5,646,932 A | 7/1997 | Kuribayashi et al. | 369/126 |
| 5,724,336 A | 3/1998 | Morton | |
| 5,751,685 A | 5/1998 | Yi | 369/126 |
| 5,777,977 A | 7/1998 | Fujiwara et al. | |
| 5,808,977 A | 9/1998 | Koyanagi et al. | 369/127 |
| 5,914,920 A | 6/1999 | Yokogawa | 369/275.3 |
| 5,946,284 A | 8/1999 | Chung et al. | 369/126 |
| 5,985,404 A | 11/1999 | Yano et al. | |
| 6,001,519 A | 12/1999 | Yang et al. | |
| 6,096,434 A | 8/2000 | Yano et al. | |
| 6,197,989 B1 | 3/2001 | Furukawa et al. | 556/450 |
| 6,477,132 B1 | 11/2002 | Azuma et al. | 369/126 |
| 6,510,130 B2 | 1/2003 | Hayashi et al. | 369/275.3 |
| 6,515,957 B1 | 2/2003 | Newns et al. | 369/126 |
| 6,606,726 B1 | 8/2003 | Wilhelmsson et al. | |
| 6,653,630 B2 | 11/2003 | Rosenman et al. | 250/306 |
| 6,762,402 B2 | 7/2004 | Choi et al. | 250/234 |
| 6,841,220 B2 | 1/2005 | Onoe et al. | 428/66.7 |
| 6,850,480 B1 | 2/2005 | Naito et al. | |
| 6,912,193 B2 | 6/2005 | Cho et al. | 369/126 |
| 6,942,914 B2 | 9/2005 | Onoe et al. | |
| 6,965,545 B2 | 11/2005 | Hino et al. | 369/13.54 |
| 7,065,033 B2 | 6/2006 | Onoe et al. | 369/126 |
| 7,149,180 B2 | 12/2006 | Onoe et al. | 369/276 |
| 7,151,739 B2 | 12/2006 | Cho et al. | |
| 7,170,843 B2 * | 1/2007 | Hong et al. | 369/101 |
| 7,212,484 B2 | 5/2007 | Maeda et al. | |
| 7,218,600 B2 | 5/2007 | Cho et al. | |
| 7,221,639 B2 * | 5/2007 | Onoe et al. | 369/126 |
| 7,227,830 B2 | 6/2007 | Cho et al. | |
| 7,242,661 B2 | 7/2007 | Cho et al. | |
| 2002/0105249 A1 | 8/2002 | Yoshida et al. | 310/311 |
| 2002/0118906 A1 | 8/2002 | Onoe | 385/14 |
| 2002/0131669 A1 | 9/2002 | Onoe et al. | 385/14 |
| 2003/0021213 A1 | 1/2003 | Hagiwara | 369/101 |
| 2003/0053400 A1 | 3/2003 | Cho et al. | 369/126 |
| 2003/0186090 A1 | 10/2003 | Onoe et al. | |
| 2004/0027935 A1 | 2/2004 | Cho et al. | |
| 2004/0042351 A1 | 3/2004 | Onoe et al. | 369/13.01 |
| 2004/0090903 A1 | 5/2004 | Cho et al. | 369/126 |
| 2004/0105373 A1 | 6/2004 | Maeda et al | 369/101 |
| 2004/0105380 A1 | 6/2004 | Cho et al. | 369/126 |
| 2004/0114913 A1 | 6/2004 | Kume | 386/125 |
| 2004/0246879 A1 | 12/2004 | Onoe et al. | |
| 2004/0252621 A1 | 12/2004 | Cho et al. | 369/126 |
| 2004/0263185 A1 | 12/2004 | Cho et al. | 324/636 |
| 2005/0047288 A1 | 3/2005 | Maeda et al. | 369/53.25 |
| 2005/0098532 A1 | 5/2005 | Onoe et al. | 216/22 |
| 2005/0099895 A1 | 5/2005 | Maeda et al. | 369/13.01 |
| 2005/0122886 A1 | 6/2005 | Takahashi et al. | 369/126 |
| 2006/0182004 A1 | 8/2006 | Maeda et al. | |
| 2006/0219655 A1 | 10/2006 | Cho et al. | |
| 2006/0245312 A1 | 11/2006 | Maeda et al. | |
| 2007/0014047 A1 | 1/2007 | Cho et al. | |

FOREIGN PATENT DOCUMENTS

| | | |
|---|---|---|
| EP | 0 739 004 | 11/1996 |
| EP | 1 091 355 A2 | 4/2001 |
| EP | 1 154 422 | 11/2001 |
| EP | 1 369 864 A | 12/2003 |
| EP | 1 381 042 A | 1/2004 |
| GB | 644 426 A | 10/1950 |
| GB | 1 484 256 | 9/1977 |
| JP | 55 139643 A | 10/1980 |
| JP | 57-200956 | 12/1982 |
| JP | 57200956 | 12/1982 |
| JP | 07334940 | 12/1995 |
| JP | 08-075806 | 3/1996 |
| JP | 10-334525 | 12/1998 |
| JP | 2003085969 | 3/2003 |
| WO | WO 01/97385 A | 12/2001 |

OTHER PUBLICATIONS

Kazuta et al, "Determination of crystal polarities of piezoelectric thin film using scanning nonlinear dielectric microscopy", Journal of European Ceramic Society 21 (2001) 1581-1584.

The Institution of Electrical Engineers, Stevenage, GB; Jun. 1, 2002; Hiranga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Society 21 (2001) 2131-2134.

Cho et al., Nano domain engineering using scanning nonlinear dielectric microscopy, Oct. 29, 2001, IEE-NANO 2001, pp. 352-357.

Cho et al, "Tbit/inch$^2$ ferroelectric data storage based on scanning nonlinear dielectric microscopy", Applied Physics Letters, vol. 81, No. 23, Dec. 2, 2002, pp. 4401-4403.

* cited by examiner

FIG. 10

DIELECTRIC REPRODUCING APPARATUS, DIELECTRIC RECORDING APPARATUS, AND DIELECTRIC RECORDING/REPRODUCING APPARATUS

BACKGROUND OF THE INVENTION

1. Field of the Invention

The present invention relates to a dielectric reproducing apparatus, a dielectric recording apparatus and a dielectric recording/reproducing apparatus for recording/reproducing information with high density in/from microdomains in a dielectric substance.

2. Description of the Related Art

As high-density, large-capacity recording/reproducing apparatuses of randomly accessible type, there are known an optical disc apparatus and a hard disc drive (HDD) apparatus. Moreover, a recording/reproducing technique using a scanning nonlinear dielectric microscopy (SNDM) for the nanoscale analysis of a dielectric (ferroelectric) material has been recently proposed by the inventors of the present invention.

In optical recording, which uses an optical pickup with a laser as a light source, data is recorded by forming pits that are concave-convex on a disc surface or forming a crystal phase or amorphous phase of a phase shift medium, and the data is reproduced by using the difference in the reflectance between the crystal phase and the amorphous phase or using the magneto optical effect. However, the pickup is relatively large, which is not appropriate for high-speed reading, and the size of the recording pit is defined by the diffraction limit of light, so that its recording density is limited to 50 G bit/inch$^2$.

In the longitudinal recording of magnetic recording as represented by the HDD, a magnetic resistance (MR) head has been recently realized by using giant magnetic resistance (GMR), and its recording density is expected to be larger than that of the optical disc by using perpendicular magnetic recording. However, the recording density is limited to 1 T bit/inch$^2$ because of thermal fluctuation of magnetic recording information and the presence of a Bloch wall in a portion in which a code is reversed. Even if patterned media are used considering the above cause, it is difficult to overcome this limit.

The SNDM can detect the plus and minus of a ferroelectric domain by measuring a non-linear dielectric constant of a ferroelectric material. The SNDM can perform the detection of the ferroelectric domain in sub-nanometer resolution by using an electrically conductive cantilever (or probe) provided with a small projection on its tip portion, which is used for an atomic force microscopy (AFM) or the like. In the SNDM, a resonance circuit is used for the detection of the ferroelectric domain. The resonance circuit is provided with a probe, an inductor, an oscillator and a return electrode. The oscillation in the resonance circuit generates a high frequency signal having a frequency determined by an inductance of the inductor and a capacitance of a ferroelectric material just under the tip portion of the probe. The high frequency signal is applied from the tip portion of the probe to the ferroelectric material and returns from the ferroelectric material to the resonance circuit through the return electrode placed near the tip portion of the probe. The differential capacitance of the ferroelectric material changes depending on the non-linear dielectric constant of the ferroelectric material. The resonance circuit converts the change of the differential capacitance into the change of the frequency of the high frequency signal. Namely, the resonance circuit performs frequency modulation. Then, frequency-amplitude conversion is performed on the frequency-modulated signal. Then, coherent detection is performed on the converted signal by using a lock-in amplifier or the like, so that information corresponding to the differential capacitance of the ferroelectric material is extracted. On the basis of the extracted information, the plus and minus of the ferroelectric domain is detected.

However, the SNDM is originally designed for an analysis apparatus. The SNDM has not been developed in view of a recording/reproducing apparatus. For example, in the above-mentioned SNDM, coherent detection is performed by using a lock-in amplifier to extract the information corresponding to the differential capacitance of the ferroelectric material. The coherent detection is suitable for high accurate detection, to be sure, but it takes time to obtain a detection result. Further, a device or circuit for coherent detection (e.g. a lock-in amplifier) is large in size.

SUMMARY OF THE INVENTION

It is therefore an object of the present invention to provide a dielectric reproducing apparatus, a dielectric recording apparatus, and a dielectric recording/reproducing apparatus for recording/reproducing data in/from a dielectric recording medium by using the SNDM, which can perform high-speed recording/reproducing and which are provided with a small, integration-capable recording/reproducing head.

The above object of the present invention can be achieved by a dielectric reproducing apparatus for reproducing data recorded in a dielectric material, provided with: a probe for detecting a capacitance of the dielectric material which differs depending on a polarization state of the dielectric material corresponding to the data; an alternating current signal generation device for generating an alternating current signal and applying the alternating current signal to the dielectric material; an oscillation device for generating an oscillation signal modulated in frequency according to the capacitance of the dielectric material which is detected through the probe in a situation that the alternating current signal is being applied to the dielectric material; a demodulation device for demodulating the oscillation signal; and a data reproduction device for reproducing the data on the basis of phase information of the demodulated oscillation signal.

The dielectric reproducing apparatus is based on a principle explained hereinafter. Data is recorded in the dielectric material as the polarization direction of a dielectric substance (or a ferroelectric substance). The non-linear dielectric constant of the ferroelectric substance changes depending on whether the polarization direction of the ferroelectric substance is plus or minus. The change of the non-linear dielectric constant of the ferroelectric substance can be measured by detecting the change of a differential capacitance of the ferroelectric substance with an alternating current (AC) electric field being applied. For example, if the polarization direction is plus, the differential capacitance decreases along with the increase of the AC electric field. On the other hand, if the polarization direction is minus, the differential capacitance increases along with the increase of the AC electric field. Therefore, if generating a signal which indicates the change of the differential capacitance upon applying the AC electric field (hereinafter referred to as "a differential capacitance signal"), the differential capacitance signal obtained when the polarization direction is plus and the differential capacitance signal obtained when the polarization direction is minus are different from each other in phase by pi($\pi$). Consequently, the detection of the difference in the phase of the differential capacitance signals allows the learning of the plus and minus of the polarization directions, thereby realizing the reproduction of the data recorded in the dielectric material.

Based on this principle, the dielectric reproducing apparatus operates as follows. The AC signal generation device generates the AC signal and applies it to the dielectric material. By the application of the AC signal, an AC electric field is generated in the dielectric material. The maximum intensity of the AC electric field is smaller than the intensity of the coercive electric field of the dielectric material. According to the AC electric field, a capacitance of the dielectric material just under the tip portion of the probe is periodically changed. In such a situation, the probe detects a differential capacitance of the dielectric material just under the tip portion of the probe.

The oscillation device generates the oscillation signal modulated in frequency according to the capacitance of the dielectric material in the situation that the alternating current signal is being applied to the dielectric material. The oscillation signal generated by the oscillation device has a frequency that changes according to the changes of the differential capacitance detected by the probe. As mentioned above, the change of the differential capacitance indicates the change of the non-linear dielectric constant of the dielectric material. Further, the change of the non-linear dielectric constant of the dielectric material differs depending on whether the polarization direction of the dielectric material is plus or minus. Therefore, the frequency of the oscillation signal differs depending on the polarization state of the dielectric material. Incidentally, in order to detect the differential capacitance of the dielectric material or generate the oscillation signal modulated according to the capacitance of the dielectric material, it is preferable that the frequency of the oscillation signal is greater than the frequency of the AC signal. For example, it is preferable to set the frequency of the oscillation signal in the range of approximately 10 MHz to 10 GHz (more concretely, at approximately 1 GHz). Further, it is preferable that to set the frequency of the AC signal at a value that is not greater than approximately 1% of the value of the frequency of the oscillation signal (more concretely, at approximately 5 kHz). Furthermore, it is preferable that the amplitude of the oscillation signal is smaller than the amplitude of the AC signal.

The demodulation device demodulates the oscillation signal. The demodulated oscillation signal has the amplitude that changes in correspondence with the change of the differential capacitance of the dielectric material just under the tip portion of probe. The demodulated oscillation signal corresponds to the "differential capacitance signal." In an ideal situation, the demodulated oscillation signal obtained when the polarization direction is plus and the demodulated oscillation signal obtained when the polarization direction is minus are different from each other in phase by pi($\pi$).

The data reproduction device recognizes the polarization direction of the dielectric material just under the tip portion of the probe on the basis of the phase of the demodulated oscillation signal. Thus, the data recorded in the dielectric material is reproduced. For example, Phase shift keying (PSK) demodulation can be used for the data reproduction process in the data reproduction device.

Data is reproduced by detecting the phase difference, so that a reproduction rate becomes higher than that of the coherent detection using a lock-in amp or the like. Moreover, the apparatus can be realized with a small-scaled circuit, and it is possible to miniaturize and integrate it.

Furthermore, it can be provided with a plurality of probes. In this case, alternating current signals with different frequencies are separately applied to the respective probes. Further, in this case, it is preferable to separate the signals with filters to prevent the signals from interfering with each other.

Moreover, since miniaturization is possible, the relative position movement of the probe and the dielectric material, which is a recording medium, can take not only a mode of moving the dielectric medium with respect to the probe, such as rotational movement, but also a mode of moving a reproducing head including the probe with respect to the recording medium, such as linear movement in an X-Y plane. It is also possible to obtain a signal for tracking from the intensity of the demodulated oscillation signal.

In one aspect of the dielectric reproducing apparatus of the present invention, the data reproduction device may be configured so as to reproduce the data on the basis of a difference in phase between the AC signal and the demodulated oscillation signal.

As mentioned above, the differential capacitance is detected in the situation that the AC electric field is generated in the dielectric material by applying the AC signal. The oscillation signal that indicates the differential capacitance detected in this situation is generated by the oscillation device. This oscillation signal is demodulated by the demodulation device. Therefore, the demodulated oscillation signal has the same frequency as that of the AC signal in an ideal situation. Therefore, the difference ($\pi$) in phase between the demodulated oscillation signal obtained when the polarization direction is plus and the demodulated oscillation signal obtained when the polarization direction is minus can be recognized by comparing the AC signal and the demodulated oscillation signal. According to this aspect, it is possible to increase the rate of the data reproduction process in the data reproduction device in comparison with a coherent detection carried out with a lock-in amplifier or the like. Further, it is possible to make the dielectric reproducing apparatus small in size. Therefore, it is possible to realize an integrated small head containing almost all of the parts of the dielectric reproducing apparatus.

In another aspect of the dielectric reproducing apparatus of the present invention, the data reproduction device may be configured so as to reproduce the data by comparing a phase of the demodulated oscillation signal in a first period and a phase of the demodulated oscillation signal in a second period.

As mentioned above, the demodulated oscillation signal obtained when the polarization direction is plus and the demodulated oscillation signal obtained when the polarization direction is minus are different from each other in phase by pi($\pi$). Therefore, the data can be reproduced by comparing the phase of the demodulated oscillation signal in a first period and a phase of the demodulated oscillation signal in a second period. In this case, it is preferable that each of the first period and the second period is determined in advance on the basis of the cycle of the demodulated oscillation signal. Further, it is preferable that the first period and the second period are successively arranged each other. For example, if there is no phase difference between the demodulated oscillation signal in a first period and a phase of the demodulated oscillation signal in a second period, they are determined to be the same data (the same bit condition in the data), and if there is a phase difference, then they are determined to be different. For example, such a data reproduction process can be realized by using a post-detection method which is one way of the PSK demodulation. According to this aspect, data can be reproduced by the phase comparison, so that it is possible to reproduce it at higher speed. Moreover, the circuit scale becomes smaller, so that it is possible to integrate a head.

The above object of the present invention can be achieved by a dielectric recording/reproducing apparatus for performing data recording and data reproduction using a dielectric material as a recording medium, provided with: a probe for recording data to be recorded in the dielectric material and for detecting a capacitance of the dielectric material which differs depending on a polarization state of the dielectric material corresponding to the data; a recording signal generation device for generating a recording signal corresponding to the data to be recorded; an application device for applying the recording signal to the dielectric material through the probe; an alternating current signal generation device for generating an alternating current signal and applying the alternating current signal to the dielectric material; an oscillation device for generating an oscillation signal modulated in frequency according to the capacitance of the dielectric material which is detected through the probe in a situation that the alternating current signal is being applied to the dielectric material; a demodulation device for demodulating the oscillation signal; and a data reproduction device for reproducing the data on the basis of phase information of the demodulated oscillation signal.

The dielectric recording/reproducing apparatus can perform not only the data reproduction process but also the data recording process using the dielectric material as a recording medium. Data can be recorded in the dielectric material by locally applying the electric field greater than the coercive electric field of the dielectric material. Namely, the data can be recorded by setting polarization directions of the dielectric material in such a condition that the polarization directions correspond to the bit condition of the data.

Based on this principle, the recording signal generation device generates the recording signal corresponding to the data to be recorded. The application device applies the recording signal to the dielectric material through the probe. By applying the recording signal through the probe, the polarization direction just under the tip portion of the probe is set.

On the other hand, the dielectric recording/reproducing apparatus has the alternating current signal generation device, the oscillation device, the demodulation device and the data reproduction device. The dielectric recording/reproducing apparatus performs the data reproduction by using these devices and the probe. These devices are the almost same as those of the dielectric reproducing apparatus mentioned above.

In the dielectric recording/reproducing apparatus, the probe is used for the data recording and the data reproducing. Incidentally, a single probe or multiple probes may be used for both the data recording and the data reproducing. Alternatively, one probe or one group of probes may be exclusively used for data recording and another probe or another group of probes may be exclusively used for data reproducing.

In one aspect of the dielectric recording/reproducing apparatus of the present invention, a switching device may be added to the dielectric recording/reproducing apparatus. The switching device is a device for switching between a first line for sending the recording signal from the application device to the dielectric material through the probe and a second line for sending the AC signal from the AC signal generation device to the dielectric material.

When the data recording process is performed, the switching device switches over to the first line. Then, the recording signal is sent from the application device to the probe through the first line, and it is applied to the dielectric material from the probe. When the data reproduction process is performed, the switching device switches over to the second line. Then, the AC signal is sent from the AC signal generation device to the dielectric material through the second line.

In another aspect of the dielectric recording/reproducing apparatus of the present invention, the application device may be configured so as to have a superimposing device for superimposing the AC signal onto the recording signal. In this case, the application device applies the recording signal on which the AC signal is superimposed to the dielectric material through the probe.

In this configuration, data can be recorded in the dielectric material by applying the recording signal. At the same time, the recorded data can be reproduced by applying the AC signal. Thus, the data recorded in the dielectric material can be reproduced immediately the data was recorded. Therefore, the recorded data can be monitored while the data is being recorded. Thus, the dielectric recording apparatus with the monitor function or the dielectric recording/reproducing apparatus with the monitor function can be realized.

In the dielectric recording/reproducing apparatus with the monitor function, it is preferable that a switching device for switching between a first line for sending the recording signal, on which the alternating current signal is superimposed, from the application device to the dielectric material though the probe and a second line for sending the alternating current signal from the alternating current signal generation device to the dielectric material is added.

In this configuration, when the data recording process is performed, the switching device switches over to the first line. Then, the recording signal and AC signal are sent from the application device to the probe through the first line, and they are applied to the dielectric material from the probe. When the data reproduction process is performed, the switching device switches over to the second line. Then, only the AC signal is sent from the AC signal generation device to the dielectric material through the second line.

Incidentally, in the above-explained dielectric reproducing apparatus, dielectric recording apparatus and dielectric recording/reproducing apparatus, with respect to the shape of the electrode for applying an electric field, a pin shape or needle-shape, the cantilever-shape, and the like are known as its specific structures. The electrode having these shapes is collectively referred to as the "probe" in the present application as occasion demands.

As the dielectric material (ferroelectric material), $LiTaO_3$ may be used, for example. The recording is performed with respect to the Z surface of the $LiTaO_3$, where a plus surface and a minus surface of the polarization are in a 180-degree domain relationship. Other dielectric materials may be used.

Moreover, the above-explained dielectric reproducing apparatus, dielectric recording apparatus and dielectric recording/reproducing apparatus use a method of recording/reproducing information in/from the dielectric recording medium on the basis of the SNDM method. The SNDM technique is introduced in detail by the present inventor, Yasuo Cho, in Oyo Butsuri Vol. 67, No. 3, p327 (1998). By using the SNDM technique, it is possible to reproduce the data recorded in the dielectric material in a nanoscale resolution. Therefore, data recording density can be increased, so that extremely high-density recording becomes possible. Furthermore, by applying the present invention, the high-speed data reproduction and production of the integrated small head also become possible.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS (Embodiment of Dielectric Reproducing Apparatus)

Figure 1:
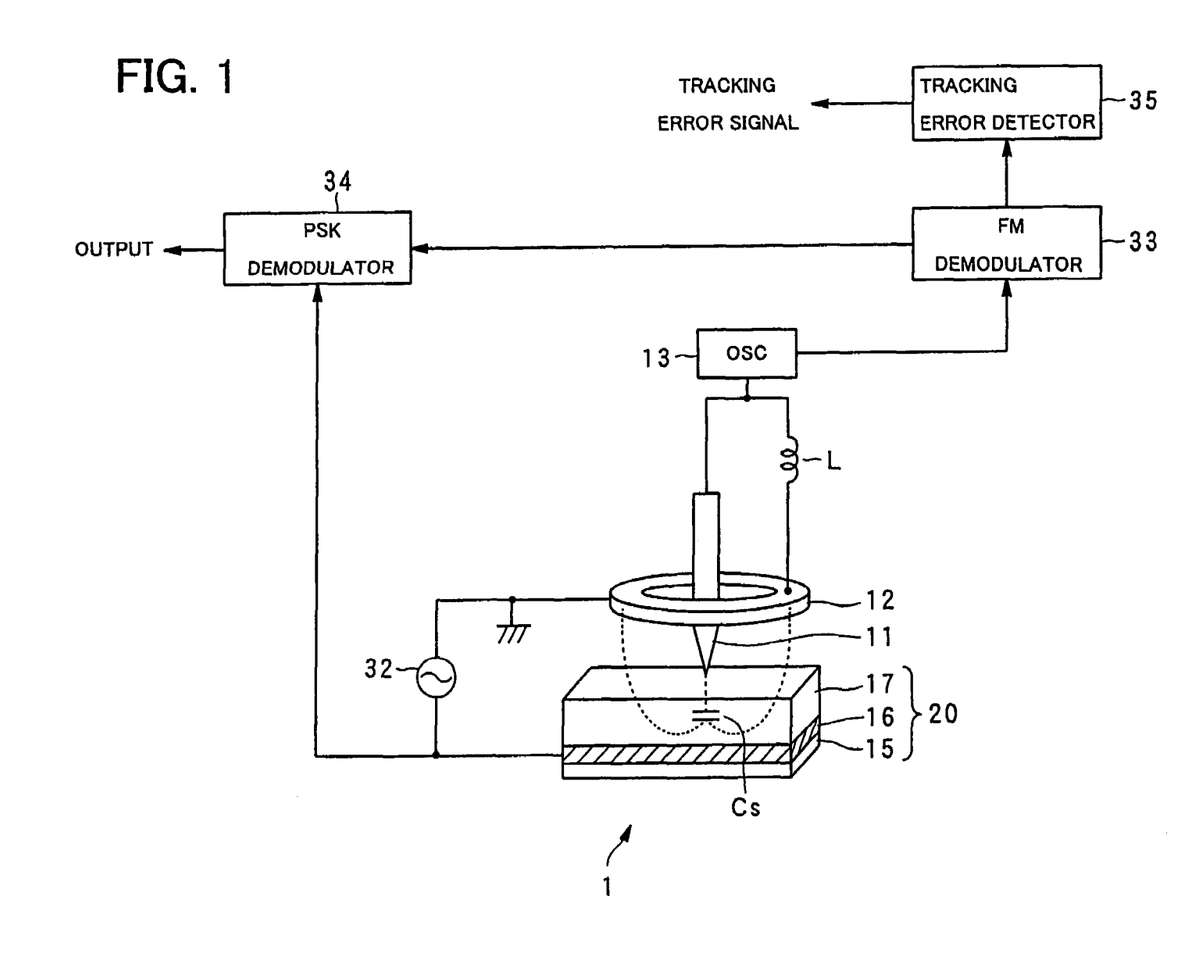
FIG. 1 is a schematic diagram showing the construction of an embodiment of a dielectric reproducing apparatus associated with the present invention.
Figure 2A:
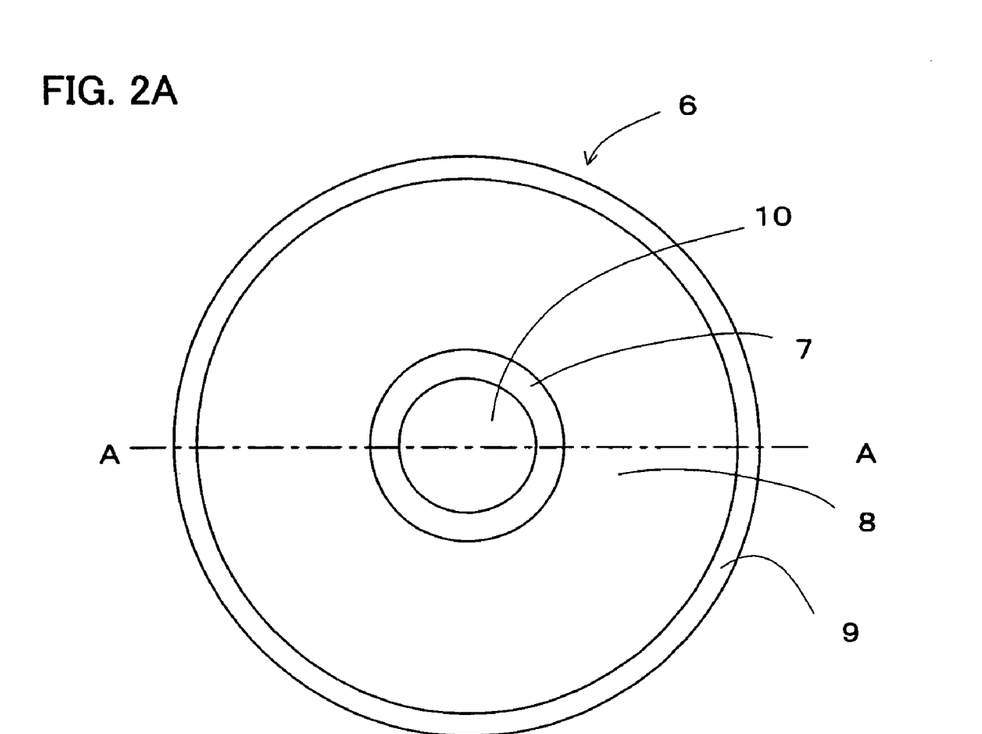
FIG. 2A is a plan view showing an example of a ferroelectric recording medium.
Figure 2B:
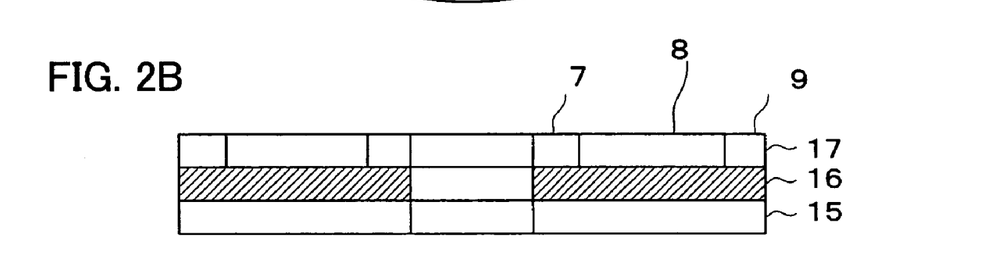
FIG. 2B is an A2-A2 cross sectional view of FIG. 2A.
Figure 3:
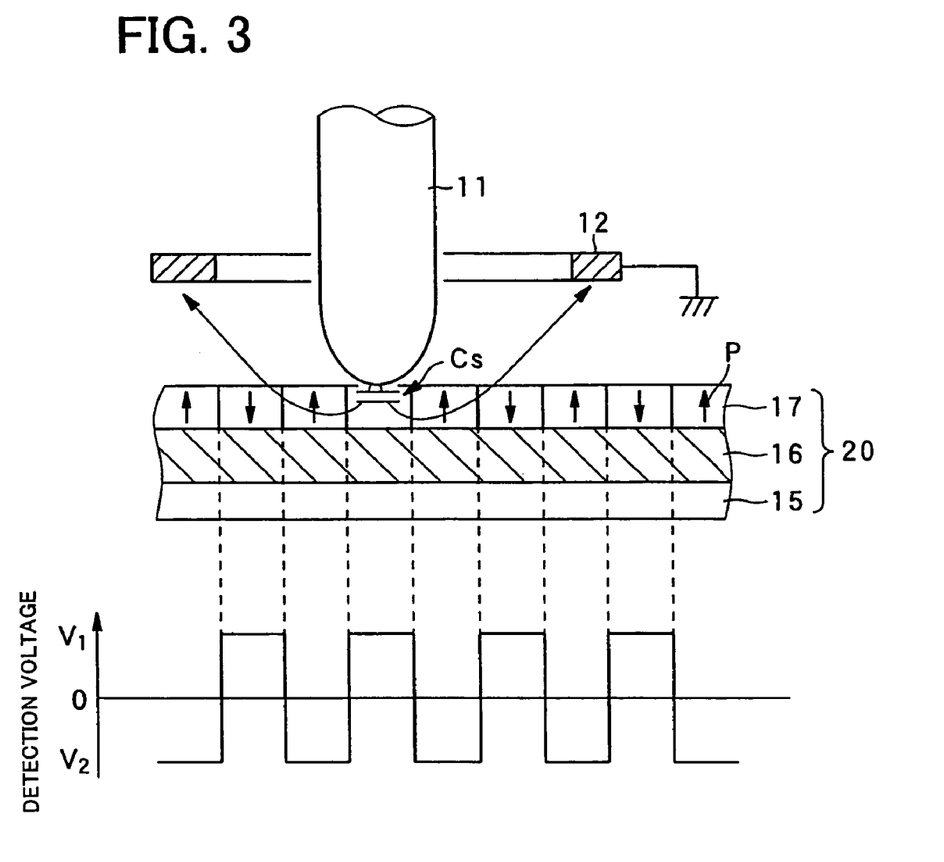
FIG. 3 is an explanatory diagram of the recording/reproducing of information with respect to a ferroelectric substance.
Figures 4A, 4B:
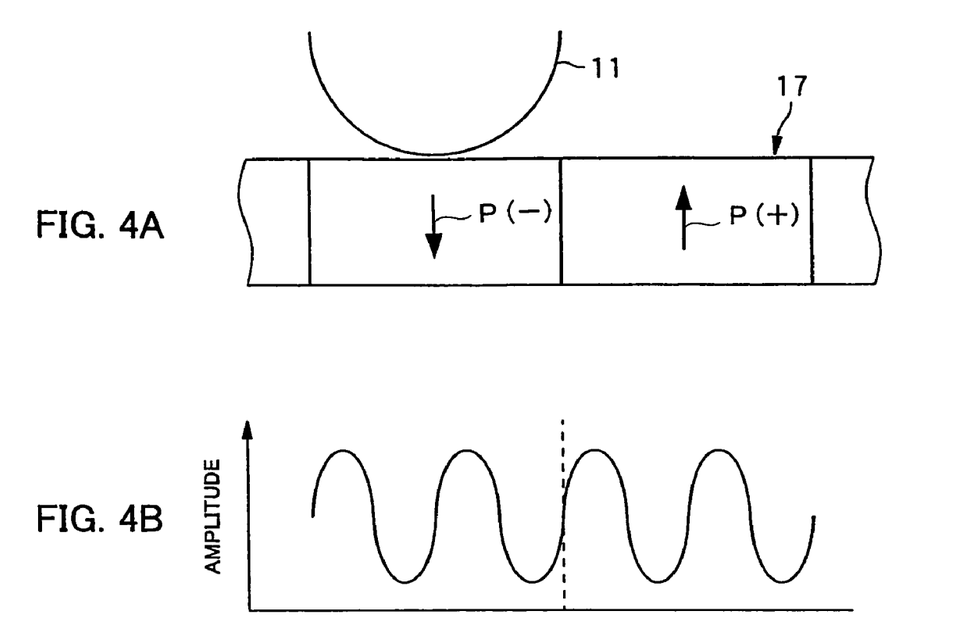
FIG. 4A to FIG. 4C are schematic diagrams showing a relationship among a polarization state, a FM demodulated signal, and a reference signal in PSK demodulation.
Figure 4C:
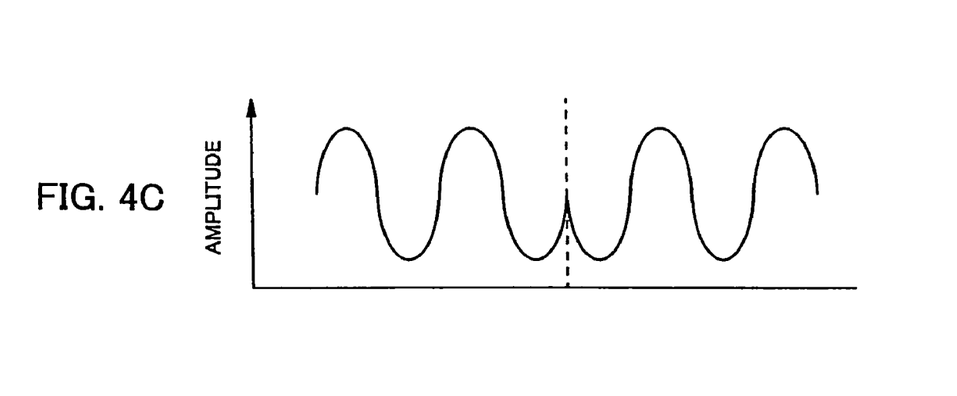
Figure 5:
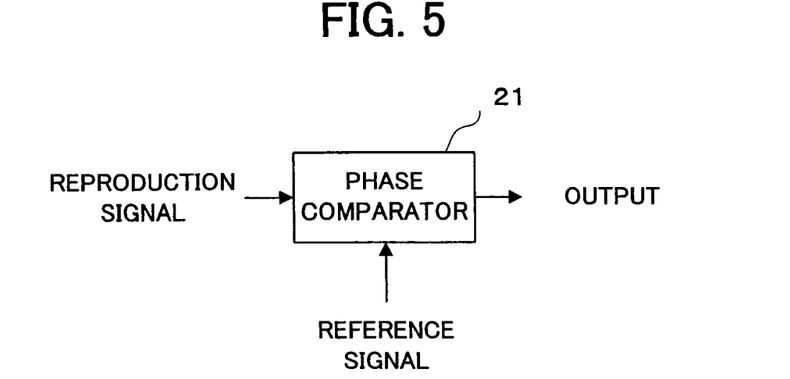
FIG. 5 is a block diagram showing one mode of data reproduction based on phase information.
Figure 6:
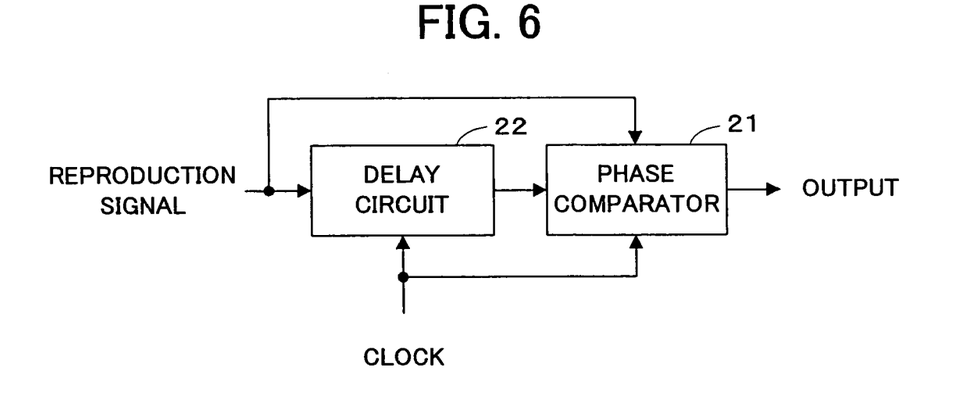
FIG. 6 is a block diagram showing another mode of data reproduction based on phase information.

An embodiment of a dielectric reproducing apparatus associated with the present invention will be explained with reference to FIG. 1 to FIG. 6. FIG. 1 is a schematic diagram showing the construction of an embodiment of a dielectric reproducing apparatus associated with the present invention. FIG. 2A and FIG. 2B are views showing an example of a ferroelectric recording medium. FIG. 3 is an explanatory diagram of the recording/reproducing of information with respect to a ferroelectric substance. FIG. 4A to FIG. 4C are schematic diagrams showing a relationship among a polarization state, a FM demodulated signal, and a reference signal in PSK demodulation. FIG. 5 and FIG. 6 are block diagrams showing the mode of data reproduction based on phase information.

As shown in FIG. 1, a dielectric reproducing apparatus 1 associated with the embodiment is provided with: a probe 11 for applying an electric field with its tip portion facing to a ferroelectric material 17 of a ferroelectric recording medium 20; a return electrode 12 for returning the electric field applied from the probe 11; an inductor L placed between the probe 11 and the return electrode 12; an oscillator 13 which oscillates at a resonance frequency determined from the inductor L and a capacitance Cs in a portion formed in the ferroelectric material 17 just under the probe 11 and polarized correspondingly to recorded information; an alternating current (AC) signal generator 32 for generating an AC signal which is applied to the ferroelectric material 17; a frequency modulation (FM) demodulator 33 for demodulating a FM modulation signal modulated by the capacitance corresponding to the polarization state owned by the ferroelectric material 17 just under the probe 11; a PSK demodulator 34 for reproducing data from the demodulated signal; a tracking error detector 35 for detecting a tracking error signal from the demodulated signal; or the like.

The probe 11 is a conductive member, or an insulating member coated with a conductive film. The tip portion facing to the ferroelectric material 17 is hemispherical, having a predetermined radius. This radius is an important factor in determining the radius of the polarization formed in the ferroelectric material 17 correspondingly to record data, so it is extremely small, on the order of 10 nm.

The return electrode 12 is an electrode for returning a high frequency electric field applied to the ferroelectric material 17 from the probe 11, and is placed so as to surround the probe 11. Incidentally, if the high frequency electric field returns to the return electrode 12 without resistance, its shape and placement can be set arbitrarily.

The inductor L is placed between the probe 11 and the return electrode 12, and may be formed with a microstripline, for example. The inductor L and the capacitance Cs constitute a resonance circuit. The inductance of the inductor L is determined so that this resonance frequency, $f=1/\{2\pi\sqrt{(LCs)}\}$, is about 1 GHz, for example.

The oscillator 13 is an oscillator which oscillates at a frequency determined from the inductor L and the capacitance Cs. The oscillation frequency varies depending on the change of the capacitance Cs. Therefore, FM modulation is performed correspondingly to the change of the capacitance Cs determined by the polarization domain corresponding to recorded data. By demodulating this FM modulation, it is possible to read the recorded data.

The ferroelectric recording medium 20 is provided with: a substrate 15; an electrode 16 placed on the substrate 15; and the ferroelectric material 17 placed on the electrode 16. As the ferroelectric material 17, $LiTaO_3$ may be used, for example. As the shape of the ferroelectric recording medium 20, there are a disc form, a card form, or the like. The relative position movement to the probe 11 is performed by the rotation of the medium or by the linear movement of either the probe 11 or the medium.

The probe 11 touches the ferroelectric material 17, or faces to it with a small space. Corresponding to the radius of the tip portion of the probe 11, a polarization domain corresponding to data is formed in the ferroelectric material 17. In reproducing, the capacitance Cs, which corresponds to the polarization in the ferroelectric material 17 on or under the tip portion of the probe 11, participates in the resonance circuit made with the inductance L. By this, the oscillation frequency comes to depend on the capacitance Cs. By demodulating an oscillation signal which is FM-modulated on the basis of this capacitance Cs, a detection voltage shown in FIG. 3 is outputted, and the recorded data is reproduced.

The AC signal generator 32 generates an AC signal which is applied between the probe 11 and the ferroelectric material 17. The AC signal is applied to the ferroelectric material 17 by passing through the return electrode 12, inductor L and probe 11. Incidentally, the inductance of the inductor L does not work on the AC signal. Further, the circuit is constructed so as to prevent the AC signal flowing into the oscillator 13.

By the application of the AC signal, the AC electric field is generated in the ferroelectric material 17. The maximum intensity of the AC electric field is smaller than the intensity of the coercive electric field of the dielectric material. By the periodic change of the AC electric filed, the capacitance Cs of the ferroelectric material 17 is periodically changed. The change of the capacitance Cs corresponds to the change of the dielectric constant of the ferroelectric material 17. Since the dielectric constant of the ferroelectric material contains the non-linear component (i.e. the non-linear dielectric constant), the capacitance Cs changes in non-linear. Further, the waveform of the non-linear change of the capacitance Cs is different based on whether the polarization direction is plus or minus. Therefore, it is possible to recognize the polarization direction by detecting the differential capacitance Δ Cs.

More specifically, for example, in the situation that the AC electric field is generated in the ferroelectric material 17, when the polarization direction is plus, the differential capacitance Δ Cs decreases along with the increase of the AC electric field. On the other hand, when the polarization direction is minus, the differential capacitance Δ Cs increases along with the increase of the AC electric field. Therefore, the polarization direction can be recognized by detecting the differential capacitance Δ Cs. The differential capacitance Δ Cs is detected by the resonance circuit provided with the oscillator 13, the inductor L and the capacitance Cs of the ferroelectric material just under the tip portion of the probe 11. The oscillator 13 outputs a frequency-modulated signal that is frequency-modulated by the change of the capacitance Cs. In order to perform such a frequency modulation, the frequency of the AC signal is set at about 5 kHz.

The FM demodulator 33 demodulates the frequency-modulated signal supplied from the oscillator 13. By the demodulation, a demodulated signal is generated. This signal contains a signal component having the amplitude that is changed in correspondence with the differential capacitance Δ Cs. Namely, this signal component has a waveform corresponding to the polarization state of a potion on which the probe 11 traces. In an ideal situation, this signal component has the same frequency of the AC signal generated by the AC signal generator 32, because the differential capacitance Δ Cs is detected in the situation that the AC electric field is generated in the ferroelectric material 17 by the application of the AC signal. Further, the phase of this signal component is changed by π, depending on whether the polarization direction is plus or minus. This is because the differential capacitance Δ Cs decreases along with the increase of the AC electric field when the polarization direction is plus, whereas the differential capacitance Δ Cs increases along with the increase of the AC electric field when the polarization direction is minus.

The PSK demodulator 34 reproduces the recorded data on the basis of the comparison in phase between the demodulated signal obtained from the FM demodulator 33 and the AC signal obtained from the AC signal generator 32. As mentioned above, the demodulated signal contains the signal component corresponding to the differential capacitance Δ Cs. This signal component has the same frequency of the AC signal. Further, the phase of this signal component is changed by π depending on whether the polarization direction of the ferroelectric material 17 just under the tip portion of the probe 11 is plus or minus. Therefore, the polarization direction of the ferroelectric material 17 just under the tip portion of the probe 11 can be recognized by comparing in phase between the demodulated signal and the AC signal. Since the data is recorded as the polarization directions, the data can be reproduced by this.

The tracking error detector 35 detects a tracking error signal for controlling the position relationship between the probe 11 and the ferroelectric recording medium 20 (i.e. a tracking control) from a signal level demodulated at the FM demodulator 33. The detected tracking error signal is inputted to the tracking mechanism to perform the tracking control.

As explained above, data is reproduced on the basis of the phase information about the AC signal and the FM-demodulated signal component in the data reproduction, so that it is possible to reproduce it at higher speed, compared to the coherent detection method by using a lock-in amp or the like. Moreover, the apparatus can be realized with a small-scaled circuit, and it is possible to miniaturize and integrate it. Furthermore, it can be provided with a plurality of probes. In this case, the AC signal is independently set for each probe, and it is necessary to separate each signal with a filter to prevent the signals from interfering with each other.

Moreover, since miniaturization is possible, the relative position movement of the probe and the ferroelectric recording medium, can take not only a mode of moving the ferroelectric medium with respect to the probe, such as rotational movement, but also a mode of moving a reproducing head including the probe with respect to the recording medium, such as linear movement in an X-Y plane.

Next, one example of a ferroelectric recording medium which is applied to the present invention will be explained. As shown in FIG. 2A, a ferroelectric recording medium 6 is in a disc form and is provided with: a center hole 10; an inner area 7; a recording area 8; and an outer area 9, arranged concentrically from the inside in this order. The center hole 10 is used when attaching it to a spindle motor or the like.

The recording area 8 in which data is recorded has tracks and spaces, each of which is between two of the tracks, and the track and the space have areas in which control information about the recording/reproducing is recorded. The inner area 7 and the outer area 8 are used to recognize the inner and outer positions of the ferroelectric recording medium 6 and can be used as areas in which information about data is recorded, such as title, address, recording time, recording capacity, or the like. Incidentally, the above-described construction is one example of the ferroelectric recording medium, and it can take other constructions, such as a card form.

As shown in FIG. 2B, the ferroelectric recording medium 6 is provided with: the substrate 15; the electrode 16 laminated on the substrate 15; and the ferroelectric material 17 laminated on the electrode 16.

The substrate 15 may be Si, for example, which is a preferable material because of its strength, chemical stability, workability, and the like. The electrode 16 is intended to generate an electric field between the electrode 16 and the probe of a recording/reproducing head and applies to the ferroelectric material 17 an electric field stronger than the coercive electric field thereof to determine the polarization direction. Data is recorded by determining the polarization direction correspondingly to the data. Incidentally, the probe is an electrode, which is provided for the recording/reproducing head, for applying an electric field, and a pin shape or needle-shape, the cantilever-shape, and the like are known as its specific structures.

As the ferroelectric material 17, $LiTaO_3$ may be used, for example, which is a ferroelectric substance. The recording is performed with respect to the Z surface of the $LiTaO_3$, where a plus surface and a minus surface of the polarization are in a 180-degree domain relationship. Other ferroelectric materials may be used.

The principle of recording/reproducing with respect to the above-described ferroelectric recording medium 6 is as shown in FIG. 3. The ferroelectric recording medium 20 is provided with: the substrate 15; the electrode 16 placed on the substrate 15; and the ferroelectric material 17 placed on the electrode 16. The ferroelectric material 17 is associated with record data depending on the directions of polarizations.

When an electric field stronger than the coercive electric field of the ferroelectric material 17 is applied between the probe 11 and the electrode 16, the ferroelectric material 17 is polarized, having directions corresponding to the direction of the applied electric field. The polarization direction corresponds to data. The reproduction is performed by detecting the capacitance Cs corresponding to the polarization state. Namely, data is reproduced by detecting the change in the oscillation frequency associated with the capacitance Cs. The return electrode 12 is an electrode for returning the electric field applied to the ferroelectric material 17 from the probe 11 and is placed so as to surround the probe 11. Incidentally, the return electrode 12 may be in any form if shaped and placed to allow the return of the electric field from the probes 11 without resistance.

Next, the PSK demodulation will be explained with reference to FIG. 4 to FIG. 6. Firstly, as shown in FIG. 4A, assuming that polarization domains, which are polarization P(+) in the plus direction and polarization P(−) in the minus direction, are formed in the ferroelectric material 17 correspondingly to data. If the AC signal applied from the AC signal generator 32 is in a condition shown in FIG. 4B with the probe 11 scanning, the FM-demodulated signal component obtained from the FM demodulator 33 is detected as a signal whose frequency is the same as that of the AC signal but whose phase changes by $\pi$ depending on the plus and minus of the polarization domain. Therefore, it is possible to reproduce the direction of the polarization domain, i.e. recorded data, on the basis of this phase difference.

FIG. 5 shows one example of the PSK demodulation. In this demodulation method, the phases of a reference signal (the AC signal of the AC signal generator 32) and a reproduction signal (the FM-demodulated signal component) are compared by a phase comparator 21. If they are in-phase, data "1" is output. If they are opposite-phase, data "0" is output.

FIG. 6 shows an example of a post-detection method which is a kind of the PSK demodulation. In this demodulation method, a reproduction signal is delayed by a clock corresponding to one data unit at a delay circuit 22. The phases of the delayed reproduction signal and a successive reproduction signal are compared by the phase comparator 21, and if the two signals are in-phase, they are determined to be the same data. For example, if the former data is "1", the next data is "1", and if the former is "0", the next is "0". On the other hand, if they are opposite-phase, they are determined to be different data. For example, if the former data is "1", the next data is "0", and if the former is "0", the next is "1".

As described above, the PSK demodulation allows high-speed reproduction because data is reproduced on the basis of the phase information.

(Embodiment of Dielectric Recording Apparatus)

Figure 7:
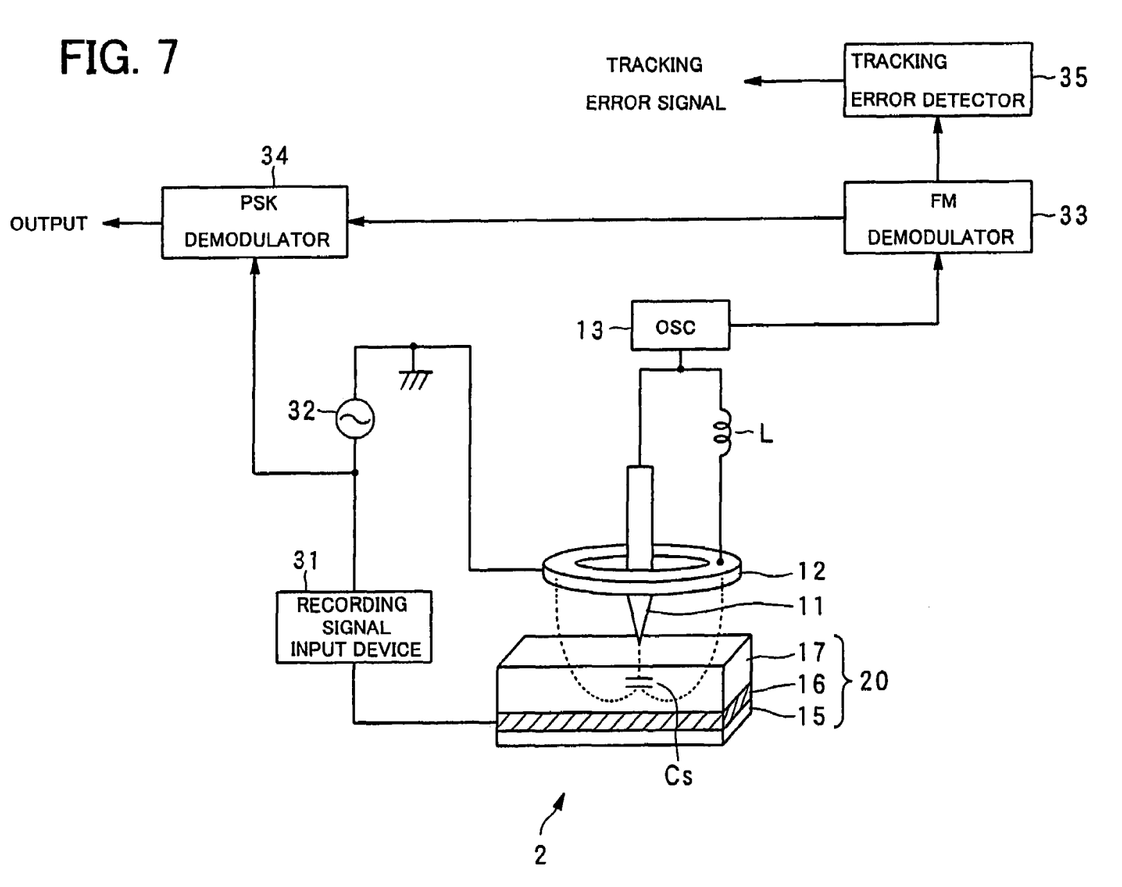
FIG. 7 is a schematic diagram showing the construction of an embodiment of a dielectric recording apparatus associated with the present invention.

An embodiment of a dielectric recording apparatus associated with the present invention will be explained with reference to FIG. 7.

A dielectric recording apparatus 2 in the embodiment is provided with: the probe 11 for applying an electric field with its tip portion facing to the ferroelectric material 17 of the ferroelectric recording medium 20; the return electrode 12 for returning the electric field applied from the probe 11; the inductor L placed between the probe 11 and the return electrode 12; the oscillator 13 which oscillates at a resonance frequency determined from the inductor L and the capacitance Cs in a portion formed in the ferroelectric material 17 just under the probe 11 and polarized correspondingly to recorded information; a recording signal input device 31 for converting data to be recorded to generate a recording signal; the AC signal generator 32 for generating an AC signal which is superimposed onto the recording signal and then applied to the probe 11; the FM demodulator 33 for demodulating a FM modulation signal modulated by the capacitance owned by the ferroelectric material 17 just under the probe 11; the PSK demodulator 34 for detecting data from the demodulated signal; the tracking error detector 35 for detecting a tracking error signal from the demodulated signal; or the like.

The dielectric recording apparatus 2 records data with respect to the ferroelectric recording medium 20 and at the same time reproduces it, so as to allow the recording operation while confirming the recording state of the data. The recording signal input device 31 converts the data to be recorded in a recording format and adds the accompanying control information to it, to generate a recording signal. Processing about an error correction, processing of data compression, and the like are also included. The signal generated at this recording signal input device 31 and the AC signal of the AC signal generator 32 are superimposed and then applied between the probe 11 and the ferroelectric material 17 by passing through the return electrode 12 and the inductor L (The inductor L does not works on the recording signal and the AC signal.). By the application of the recording signal, the data is recorded. The reproduction operation is performed by the PSK demodulation as in the above-described dielectric reproducing apparatus 1. Other constitutional elements, their functions and effects are the same as those explained in the dielectric reproducing apparatus 1, and their explanation is omitted.

(First Embodiment of Dielectric Recording/Reproducing Apparatus)

Figure 8:
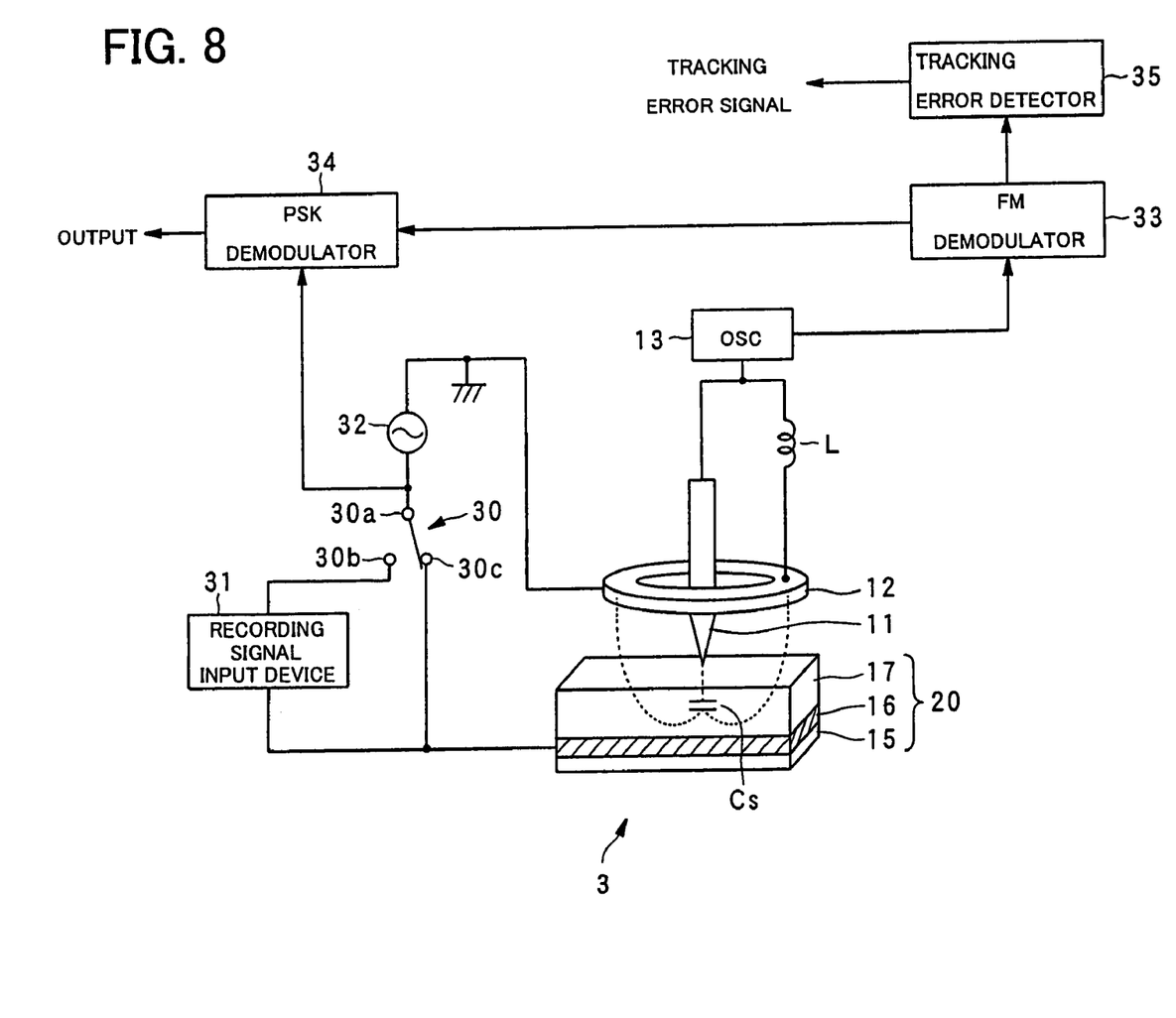
FIG. 8 is a schematic diagram showing the construction of a first embodiment of a dielectric recording/reproducing apparatus associated with the present invention.

A first embodiment of the dielectric recording/reproducing apparatus associated with the present invention will be explained with reference to FIG. 8.

A dielectric recording/reproducing apparatus 3 is provided with: the probe 11 for applying an electric field with its tip portion facing to the ferroelectric material 17 of the ferroelectric recording medium 20; the return electrode 12 for returning the electric field applied from the probe 11; the inductor L placed between the probe 11 and the return electrode 12; the oscillator 13 which oscillates at a resonance frequency determined from the inductor L and the capacitance Cs in a portion formed in the ferroelectric material 17 just under the probe 11 and polarized correspondingly to recorded information; a switch 30 for switching circuit connections depending on whether the data recording is performed or the data reproducing is performed; the recording signal input device 31 for converting data to be recorded to generate a recording signal; the AC signal generator 32 for generating an AC signal which is applied to the probe 11; the FM demodulator 33 for demodulating a FM modulation signal modulated by the capacitance owned by the ferroelectric material 17 just under the probe 11; the PSK demodulator 34 for detecting data from the demodulated signal; the tracking error detector 35 for detecting a tracking error signal from the demodulated signal; or the like.

The dielectric recording/reproducing apparatus 3 has the both functions of data recording and data reproducing with respect to the ferroelectric recording medium 20. Further, the apparatus 3 has a function that the circuit connections are switched with the switch 30 depending on whether the data recording is performed or the data reproducing performed, and a function that the AC signal is applied when the data recording is performed and the data reproducing is performed. The application of the AC signal allows the reproduction of the data when the data reproduction process is performed and the confirmation (monitoring) of the data when the data recording process is performed. Other constitutional elements, their functions and effects are the same as those explained in the dielectric reproducing apparatus 1 and the dielectric recording apparatus 2, and their explanation is omitted.

When recording, a terminal 30a of the switch 30 is connected to a terminal 30b, and the AC signal generator 32 is connected to the recording signal input device 31, so that an AC signal is superimposed onto a recording signal. This allows the application of the AC signal as well as the recording signal between the probe 11 and the ferroelectric material 17.

When reproducing, the terminal 30a of the switch 30 is connected to a terminal 30c to apply an AC signal between the probe 11 and the ferroelectric material 17. By using this AC signal, the PSK demodulation can be performed, and the high speed reproduction can be achieved.

(Second Embodiment of Dielectric Recording/Reproducing Apparatus)

Figure 9:
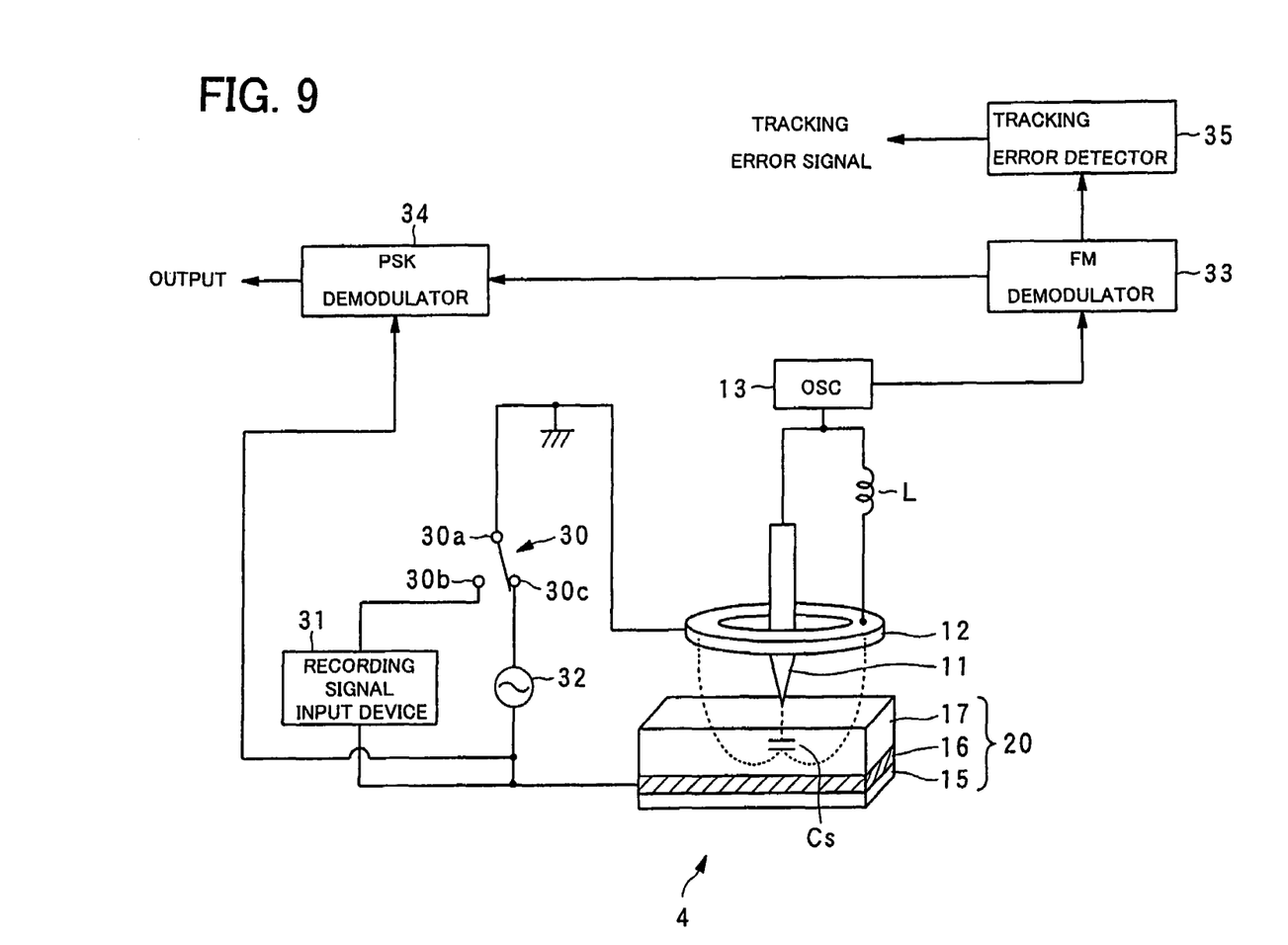
FIG. 9 is a schematic diagram showing the construction of a second embodiment of a dielectric recording/reproducing apparatus associated with the present invention.

A second embodiment of the dielectric recording/reproducing apparatus associated with the present invention will be explained with reference to FIG. 9.

A dielectric recording/reproducing apparatus 4 is provided with: the probe 11 for applying an electric field with its tip portion facing to the ferroelectric material 17 of the ferroelectric recording medium 20; the return electrode 12 for returning the electric field applied from the probe 11; the inductor L placed between the probe 11 and the return electrode 12; the oscillator 13 which oscillates at a resonance frequency determined from the inductor L and the capacitance Cs in a portion formed in the ferroelectric material 17 just under the probe 11 and polarized correspondingly to recorded information; the switch 30 for switching circuit connections depending on whether the data recording is preformed or the data reproduction is performed; the recording signal input device 31 for converting data to be recorded to generate a recording signal; the AC signal generator 32 for generating an AC signal which is applied to the probe 11; the FM demodulator 33 for demodulating a FM modulation signal modulated by the capacitance owned by the ferroelectric material 17 just under the probe 11; the PSK demodulator 34 for detecting data from the demodulated signal; the tracking error detector 35 for detecting a tracking error signal from the demodulated signal; or the like.

The dielectric recording/reproducing apparatus 4 has the both functions of recording and reproducing with respect to the ferroelectric recording medium 20. The apparatus 4 has a function that the circuit connections are switched with the switch 30 depending on whether the data recording is preformed and the data reproduction is performed. In the apparatus 4, the AC signal is applied between the probe 11 and the ferroelectric material 17 when the data reproducing process is performed. When the data recording process is performed, the AC signal is not applied. Other constitutional elements, their functions and effects are the same as those explained in the dielectric reproducing apparatus 1 and the dielectric recording apparatus 2, and their explanation is omitted.

When recording, the terminal 30a of the switch 30 is connected to the terminal 30b to apply a recording signal from the recording signal input device 31 between the probe 11 and the ferroelectric material 17. On the other hand, when reproducing, the terminal 30a of the switch 30 is connected to the terminal 30c to apply an AC signal between the probe 11 and the ferroelectric material 17. By using this AC signal, the PSK demodulation can be performed, and the high speed reproduction can be achieved.

Incidentally, the dielectric recording/reproducing apparatuses 3 and 4 have such a circuit construction that the inductance of the inductor L, which constructs a resonance circuit, has a small effect on the frequency component of a recording signal as an inductance component, and they are in the mode that a voltage is applied between the probe 11 and the ferroelectric material 17 through the return electrode 12 and the inductor L. If the inductance has a large effect, it takes the following embodiment.

(Third Embodiment of Dielectric Recording/Reproducing Apparatus)

Figure 10:
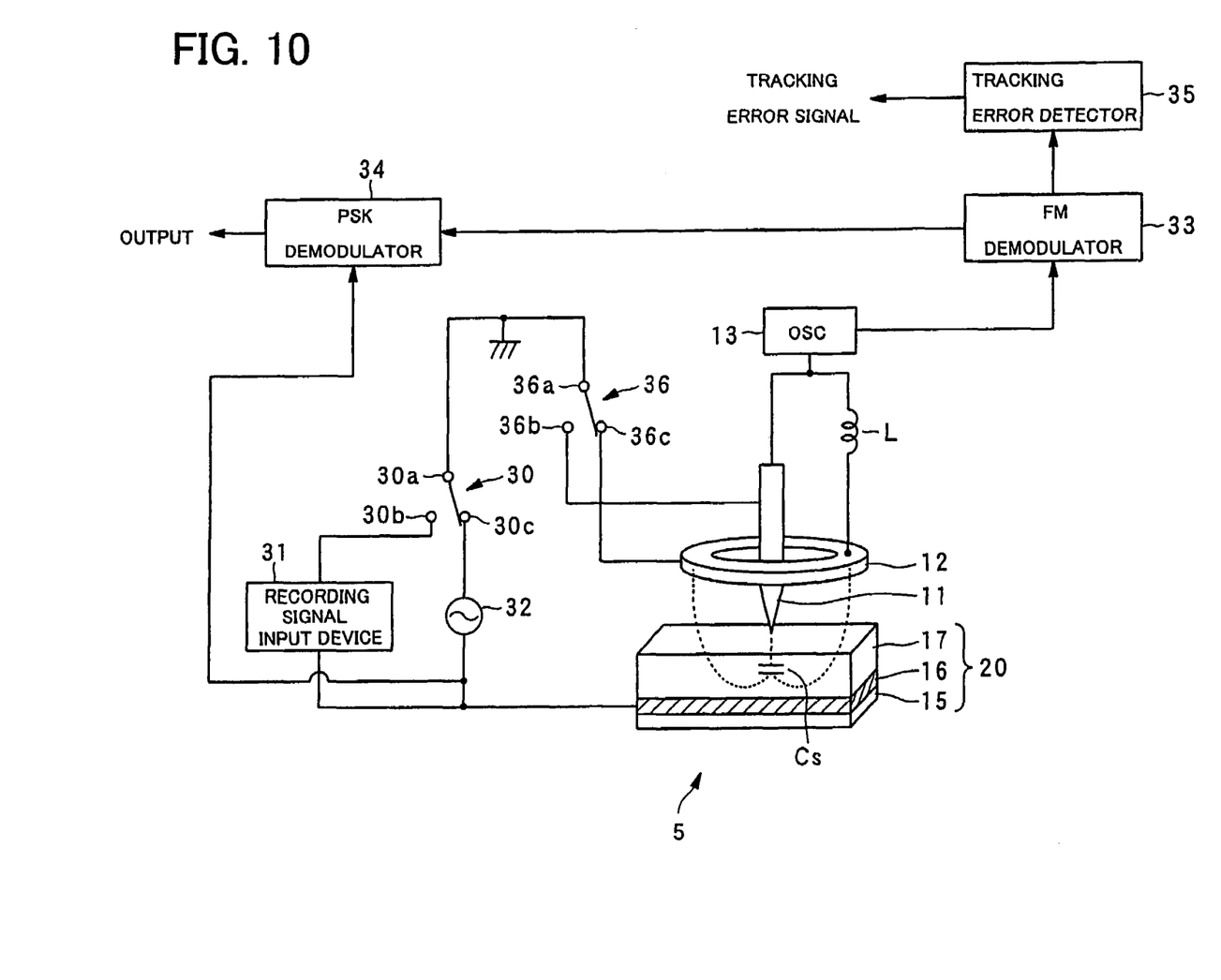
FIG. 10 is a schematic diagram showing the construction of a third embodiment of a dielectric recording/reproducing apparatus associated with the present invention.

A third embodiment of the dielectric recording/reproducing apparatus associated with the present invention will be explained with reference to FIG. 10. The third embodiment indicates an example in the case where the inductance of the inductor L has a large effect on the frequency component of a recording signal.

A dielectric recording/reproducing apparatus 5 is provided with: the probe 11 for applying an electric field with its tip portion facing to the ferroelectric material 17 of the ferroelectric recording medium 20; the return electrode 12 for returning the electric field applied from the probe 11; the inductor L placed between the probe 11 and the return electrode 12; the oscillator 13 which oscillates at a resonance frequency determined from the inductor L and the capacitance Cs in a portion formed in the ferroelectric material 17 just under the probe 11 and polarized correspondingly to recorded information; the switch 30 and a switch 36 for switching circuit connections depending on whether the data recording is performed or the data reproducing performed; the recording signal input device 31 for converting data to be recorded to generate a recording signal; the AC signal generator 32 for generating an AC signal which is applied to the probe 11; the FM demodulator 33 for demodulating a FM modulation signal modulated by the capacitance owned by the ferroelectric material 17 just under the probe 11; the PSK demodulator 34 for detecting data from the demodulated signal; the tracking error detector 35 for detecting a tracking error signal from the demodulated signal; or the like.

The dielectric recording/reproducing apparatus 5 has the both functions of recording and reproducing with respect to the ferroelectric recording medium 20, and has a function that the circuit connections are switched with the switches 30 and 36 depending on whether the data recording is performed or the data reproducing is performed. In this apparatus 5, the AC signal is applied between the probe 11 and the ferroelectric material 17 when the data reproduction is performed. Other constitutional elements, their functions and effects are the same as those explained in the dielectric reproducing apparatus 1 and the dielectric recording apparatus 2, and their explanation is omitted.

When recording, the terminal 30a of the switch 30 is connected to the terminal 30b and a terminal 36a of the switch 36 is connected to a terminal 36b, to apply a recording signal from the recording signal input device 31 between the probe 11 and the ferroelectric material 17. The terminal 36b of the switch 36 is directly connected to the probe 11, so that it is possible to avoid the influence of the inductance of the inductor L.

On the other hand, when reproducing, the terminal 30a of the switch 30 is connected to the terminal 30c and the terminal 36a of the switch 36 is connected to a terminal 36c, to construct a resonance circuit with the inductor L and the capacitance Cs. This also allows the application of an AC signal between the probe 11 and the ferroelectric material 17. By using this AC signal, the PSK demodulation can be performed, and the high speed reproduction can be achieved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosures of Japanese Patent Application No. 2002-265925 filed on Sep. 11, 2002 including the specification, claims, drawings and summary and Japanese Patent Application No. 2003-311829 filed on Sep. 3, 2003 including the specification, claims, drawings and summary are incorporated herein by reference in their entirety.

What is claimed is:

1. A dielectric reproducing apparatus for reproducing data recorded in a dielectric material, comprising:
    a probe for detecting a capacitance of the dielectric material which differs depending on a polarization state of the dielectric material corresponding to the data;
    an alternating current signal generation device for generating an alternating current signal and applying the alternating current signal to the dielectric material;
    an oscillation device for generating an oscillation signal modulated in frequency according to the capacitance of the dielectric material which is detected through the probe in a situation that the alternating current signal is being applied to the dielectric material;
    a demodulation device for demodulating the oscillation signal; and
    a data reproduction device for reproducing the data on the basis of phase information of the demodulated oscillation signal using PSK (Phased Shift Keying) demodulation.

2. The dielectric reproducing apparatus according to claim 1, wherein the data reproduction device reproduces the data on the basis of a difference in phase between the alternating current signal and the demodulated oscillation signal.

3. The dielectric reproducing apparatus according to claim 1, wherein the data reproduction device reproduces the data by comparing a phase of the demodulated oscillation signal in a first period and a phase of the demodulated oscillation signal in a second period.

4. The dielectric reproducing apparatus according to claim 1, wherein the dielectric material is a ferroelectric material.

5. A dielectric recording/reproducing apparatus for performing data recording and data reproduction using a dielectric material as a recording medium, comprising:
    a probe for recording data to be recorded in the dielectric material and for detecting a capacitance of the dielectric material which differs depending on a polarization state of the dielectric material corresponding to the data;
    a recording signal generation device for generating a recording signal corresponding to the data to be recorded;
    an application device for applying the recording signal to the dielectric material through the probe;
    an alternating current signal generation device for generating an alternating current signal and applying the alternating current signal to the dielectric material;
    an oscillation device for generating an oscillation signal modulated in frequency according to the capacitance of the dielectric material which is detected through the probe in a situation that the alternating current signal is being applied to the dielectric material;
    a demodulation device for demodulating the oscillation signal; and
    a data reproduction device for reproducing the data on the basis of phase information of the demodulated oscillation signal using PSK (Phased Shift Keying) demodulation.

6. The dielectric recording/reproducing apparatus according to claim 5, wherein the data reproduction device reproduces the recorded data on the basis of a difference in phase between the alternating current signal and the demodulated oscillation signal.

7. The dielectric recording/reproducing apparatus according to claim 5, wherein the data reproduction device reproduces the recorded data by comparing a phase of the demodulated oscillation signal in a first period and a phase of the demodulated oscillation signal in a second period.

8. The dielectric recording/reproducing apparatus according to claim 5, further comprising a switching device for switching between a first line for sending the recording signal from the application device to the dielectric material through the probe and a second line for sending the alternating current signal from the alternating current signal generation device to the dielectric material.

9. The dielectric recording/reproducing apparatus according to claim 5, wherein the application device comprising a superimposing device for superimposing the alternating current signal onto the recording signal, and the application device applies the recording signal on which the alternating current signal is superimposed to the dielectric material through the probe.

10. The dielectric recording/reproducing apparatus according to claim 9, further comprising a switching device for switching between a first line for sending the recording signal, on which the alternating current signal is superimposed, from the application device to the dielectric material though the probe and a second line for sending the alternating current signal from the alternating current signal generation device to the dielectric material.

11. The dielectric recording/reproducing apparatus according to claim 5, wherein the dielectric material is a ferroelectric material.

* * * * *